Figure 1:
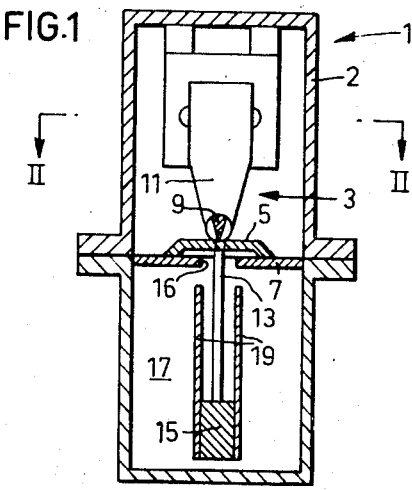

United States Patent
Lingert et al.

[15] 3,657,551
[45] Apr. 18, 1972

[54] SYSTEM FOR SENSING AND INDICATING THE SET INCLINATION OF AN OBJECT

[72] Inventors: Birger Valdemar Lingert; Axel Sture Lindblom, both of Eskilstuna, Sweden

[73] Assignee: AB Bolinder-Munktell, Eskilstuna, Sweden

[22] Filed: June 19, 1970

[21] Appl. No.: 47,792

[30] Foreign Application Priority Data

June 23, 1969 Sweden....................................8868/69

[52] U.S. Cl..........................250/231 R, 33/215 C, 33/220 R
[51] Int. Cl. ..........................................................G01d 5/34
[58] Field of Search....................250/222 R, 231 GY, 231 R; 356/149, 152; 33/220 B

[56] References Cited
UNITED STATES PATENTS 2,659,985  11/1953  Cloud....................................33/220 B Primary Examiner—James W. Lawrence
Assistant Examiner—Davis L. Willis
Attorney—Young & Thompson

[57] ABSTRACT

A system for sensing and indicating the angle at which a vehicle-carried implement is inclined to a horizontal line, including a transmitter mounted on the implement and having a pendulum swingable in a housing, said housing being pivotable by remote control with respect to said implement. The transmitter further has light radiating and light sensing means variably screened by a shield on said pendulum to produce a signal depending on the inclination from the vertical of the pendulum housing, and thus characterizing deviation or correspondence between the actual implement inclination and the desired implement inclination, which is adjustable by pivoting the pendulum housing.

10 Claims, 3 Drawing Figures

PATENTED APR 18 1972 3,657,551

BIRGER VALDEMAR LINGER
AXEL STURE LINDBLOM
INVENTORS

BY Young + Thompson
ATTYS.

SYSTEM FOR SENSING AND INDICATING THE SET INCLINATION OF AN OBJECT

The present invention relates to a system for sensing and indicating the inclination of a movable object in relation to a horizontal line, including a transmitting means arranged on the object and having a pendulum and sensing means which are adapted to transmit a signal characteristic of the inclination of the object in response to the inclination of a reference element connected with said object. The invention primarily relates to a system for indicating the set inclination of a road-grader blade or other vehicle-carried implements.

This is achieved in accordance with the invention by a system which is characterized in that the reference element is adjustably arranged in relation to the object and that the sensing means is adapted to sense the vertical position of the reference element in a plane through said horizontal line. The reference element can be set to the desired angle of inclination of the object, and the sensing means indicates when the set inclination has been reached. The reference element, which suitably consists of a housing for the pendulum, can be pivoted by a motor connected to an indicator adapted to indicate the set angle. The motor may be a stepping motor, in the current supply circuit of which is included a pulse counter, adapted to count the stepping pulses fed to the motor and to present on an indicator the result converted into angle units. The indicator and the operating means of the motor are positioned, for example, at the driving position on a road-grader, thereby enabling the driver to set the blade and check the setting.

In accordance with a suitable embodiment of the invention, the system is characterized in that the sensing means includes a light-sensitive detector mounted on the reference element and in that the pendulum which is preferably damped, is provided with a shield which, in response to variations in inclination of the reference element, shields to varying degrees the detector from impinging light. By using the light-sensitive sensing means, the contact problem originating from dirt, oxidation or vibration is eliminated. In accordance with a further development of this embodiment, the system is characterized in that the detector presents two juxtaposed light openings facing towards the pendulum shield and each provided with a light-sensitive element, and that the distance between the two light openings and the width of the shield at the level of said openings are so adjusted with respect to each other that the shield screens off substantially half of each light opening when the reference element takes a vertical position. In this way there is provided a higher degree of sensitivity by means of two signals, which change in opposite directions with changes in the angle at which the object is inclined. Furthermore, if one light source is unmovably connected with the reference element on the side of the pendulum shield remote from the detector, and if the light source presents two light openings situated opposite the light openings of the detector, a more accurate light shielding effect is obtained, since the pendulum shield screens both the rays of light from the light sources and the rays of light impinging on the light-sensitive elements.

In accordance with the invention, the signals from the two light-sensitive elements can be fed each to its respective electric circuit means, including a threshold value circuit which drives an output unit and that the two output units are connected to an indicator for disclosing the inclination of the reference element in either direction from a vertical position. The indicator is driven with signals of constant amplitude and discloses the direction in which the object is inclined. The signals may also be fed to a comparison circuit which generates a different signal, which is passed to the indicator and discloses the extent to which the reference element is inclined, i.e., the amount by which the reference element deviates from the set angle of inclination of the object. According to the invention, automatic setting of the required inclination of the object can be effected for an object which is pivotable by actuator means by feeding the signals from the output units to a converter adapted to control the actuator means, when the signals are unbalanced in a manner to pivot the object in a direction which reduces the unbalance between said signals.

For the purpose of eliminating regulation errors resulting from vibrations etc., of the object, the system according to the invention is preferably characterized in that the two electric circuit means each present an input filter adapted to eliminate by filtering high frequency signal components generated by vibrations set up in the object.

Figure 2:
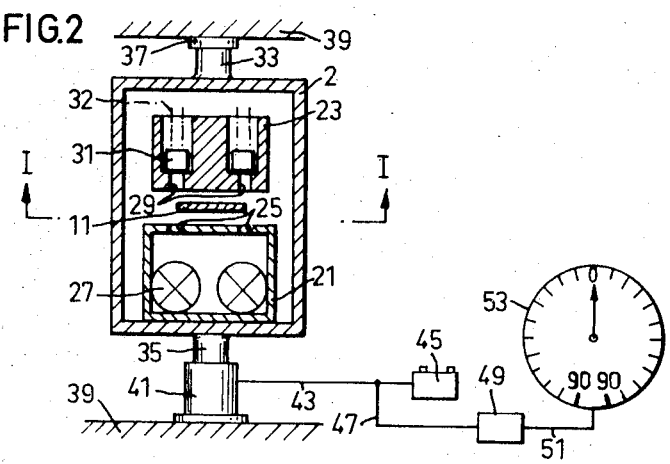
Figure 3:
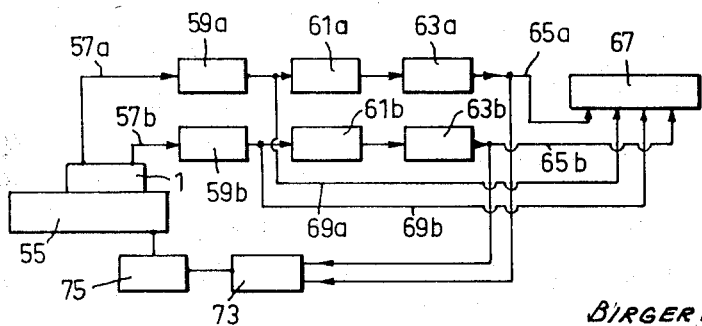

A system according to the invention for indicating and regulating the angle of inclination of the blade of a road-grader will now be described in more detail with reference to the accompanying drawing, in which FIG. 1 is a front view of a section taken along the line I—I in FIG. 2 of the transmitter mounted to the blade of the grader, FIG. 2 is a plan view of the transmitter seen in section along the line II—II in FIG. 1, and FIG. 3 is a block diagram of the arrangement.

The transmitter 1 illustrated in FIGS. 1 and 2 includes a pendulum housing 2 in which a pendulum 3 is suspended from a transversely extending trestle 5. The trestle rests on a plate 7 mounted in the housing. The pendulum is journalled on the trestle by means of a knife edge 9 and comprises an upper plate 11, which lies in a plane transversely of the knife edge, and a double pendulum arm 13, which supports the pendulum weight 15. The arm 14 extends through an opening 16 in the plate 7. The space 17 located beneath the plate 7 in the housing 2 is filled with oil, and attached to the weight are two plates 19 which extend parallel with the knife edge, thereby providing damping of the pendulum.

The upper plate 11 of the pendulum swings between a lamp housing 21 and a photocell housing 23, the two housings being mounted in the upper portion of the pendulum housing 2. The wall of the lamp housing facing the pendulum is provided with two openings 25, behind which are arranged lamps 27 or other sources of light, e.g., light diodes. The wall of the photocell housing 23 facing the pendulum is provided with two openings 29 situated opposite the openings 25 of the lamp housing. Photocells or phototransistors 31 are arranged behind the openings 29. The width of the pendulum plate 11 on the level of the openings 25 and 29 is such that its vertical side edges extend approximately centrally opposite the openings when the pendulum is in a vertical position. When taking this position, the plate thus shields approximately half the light from each lamp 27, thereby preventing the light from reaching the oppositely located phototransistor 31. When the pendulum swings in one direction, the stream of light passing to one of the phototransistors 31 is increased simultaneously as the stream of light to the other resistance is reduced. The phototransistors are connected through lines 32 with an electric circuit means, described hereinafter, for processing the signals from the phototransistors.

The pendulum housing 2 is provided with two pins 33 and 35 which extend parallel with the knife edge 9 and which are mounted on opposite sides of the housing 2 and in line with each other. The pin 33 is journalled in a bearing 37 mounted in the casing 39 of the transmitter 1. The pin 35 is connected with the rotor of a motor 41 mounted on the transmitter casing 39, by means of which motor the pendulum housing 2 can be swung within the transmitter casing in a plane parallel with the plane of the pendulum.

The motor 41 comprises a stepping motor which is fed with pulses through a line 43 from an operating means 45. The motor is also connected through a line 47 with a pulse counter 49 which converts the pulses to a signal, fed on a line 51 to an indicator 53, which discloses in degrees or percent the set inclination of the pendulum housing 2 in either direction in the transmitter housing 39.

FIG. 3 illustrates a system in which a transmitter 1 according to FIGS. 1 and 2 is mounted on the blade 55 of a road-grader.

The driver of the vehicle can set the blade to the desired angle of inclination with respect to the horizontal plane, and thus the desired road camber or grade, by actuating the operating means 45 and reading off the indicator 53. When the blade 55 has obtained the desired inclination, the two phototransistors 31 of the transmitter send mutually similar signals. If the angle at which the blade is inclined is too great or too small, the phototransistors transmit difference signals. These signals are fed on lines 57 a, b to respective processing channels. The high frequency voltages occurring as a result of vibrations in the blade are removed by a filter 59 a, b. The filtered signal controls a flip-flop circuit 61 a, b in a Schmitt-circuit, which when the control signal exceeds a certain threshold value feeds a constant voltage to an output stage 63 a, b. The output signals from the output stages are fed on lines 65 a, b to an indicator instrument 67 from which it can be read whether the blade is inclined to a greater or to a lesser extent than that desired or at the desired angle.

The filtered signals from filters 59 a, b can be fed through lines 69 a, b to the instrument 67. These signals are compared in the instrument and the difference, which is a measurement of the magnitude of the angle between the pendulum and the pendulum housing, is presented on the instrument 67.

If the inclination of the blade deviates from the desired value, the output signals on the line 65 a, b thus indicate the direction of said deviation, while the signals on the line 69 a, b disclose the magnitude of the deviation. The data is presented on the instrument 67 and the driver can change the angle at which the blade is inclined until the desired inclination is obtained.

The blade 55, however, can also be set automatically. The signals from the output stages 63 a, b are fed on lines 71 a, b to a hydromechanic control means 73 which, depending on whether the supplied signals disclose a too great or a too small inclination, actuate the actuator means 75 of the blade in a manner whereby the inclination of said blade is decreased or increased, respectively.

What we claim is:

1. In a device for ascertaining that a desired adjustable inclination of a vehicle-carried implement relative to a horizontal line is maintained, comprising a transmitter mounted on the implement and having a pendulum, a reference element connected with the implement, and sensing means adapted to sense the inclination of the reference element with reference to the vertical and to transmit a signal characterizing said inclination; the improvement comprising remote control means operable from a control site remote from the implement for swinging the reference element relative to the implement in a vertical plane through said horizontal line, first indicating means located at said control site for indicating the swung angle of said reference element, and second indicating means also located at said control site for indicating the inclination of the reference element relative to the vertical.

2. A device according to claim 1, characterized in that the reference element comprises a pendulum housing pivotally mounted in a transmitter housing, which is fixedly connected with the implement.

3. A device according to claim 2, and a stepping motor for pivoting the pendulum housing in relation to the transmitter housing, and a pulse counter arranged in the current supply circuit of the motor for counting the stepping pulses fed to the motor and for presenting to said first indicating means the result converted into angle units.

4. A device according to claim 1, characterized in that the sensing means includes a light-sensitive detector mounted on the reference element and that the pendulum is provided with a shield which, depending on the variation in inclination of the reference element, produces varying degrees of screening of the detector from impinging light.

5. A device according to claim 4, characterized in that the detector presents two juxtaposed light openings facing the shield of the pendulum and each provided with a light-sensitive element, and in that the distance between the two light openings and the width of the shield at a level with said openings are so adjusted with respect to each other that the shield screens substantially half of each light opening when the reference element takes a vertical position.

6. A device according to claim 5, characterized in that a light source is immovably connected with the reference element on the side of pendulum shield remote from the detector, and that the light source presents two light openings situated opposite the light openings of the detector.

7. A device according to claim 5, characterized in that the signals from the two light-sensitive elements are each fed to a respective electric circuit means, including a threshold value circuit which drives an output stage and that the two output stages are connected to an indicator for disclosing the direction of inclination of the reference element with respect to a vertical position.

8. A device according to claim 7, characterized in that the two signals from the light-sensitive elements are fed to a comparison circuit, which generates a difference signal which is passed to the indicator and discloses the magnitude of the inclination of the reference element.

9. A device according to claim 7 for an implement which is pivotally arranged by means of support means, characterized in that the signals from the output units are fed to a converter adapted to control the support means when the signals are unbalanced in a manner whereby the implement is swung in the direction which reduces the unbalance of the signals.

10. A device according to claim 7, characterized in that the two electric circuits each present input filters which remove by filtering high frequency signal components occurring as a result of vibration set up in the implement.

* * * * *